United States Patent [19]
Oliver

[11] Patent Number: 6,144,965
[45] Date of Patent: Nov. 7, 2000

[54] PERFORMING MEMORY MANAGEMENT IN AN OBJECT-ORIENTED PROGRAMMING ENVIRONMENT

[75] Inventor: Richard J. Oliver, Laguna Beach, Calif.

[73] Assignees: Sony Corporation, Tokyo, Japan; Sony Pictures Entertainment Inc., Culver City, Calif.

[21] Appl. No.: 08/937,076

[22] Filed: Sep. 24, 1997

[51] Int. Cl.[7] .................................................. G06F 17/30
[52] U.S. Cl. ........................ 707/100; 707/101; 707/102; 707/103; 707/206
[58] Field of Search .................................. 707/100, 103, 707/102, 206, 101

[56] References Cited

U.S. PATENT DOCUMENTS

| | | | |
|---|---|---|---|
| 4,775,932 | 10/1988 | Oxley et al. | 707/206 |
| 4,912,629 | 3/1990 | Shuler, Jr. | 707/206 |
| 5,499,371 | 3/1996 | Henninger et al. | 395/702 |
| 5,586,329 | 12/1996 | Knudsen et al. | 707/100 |
| 5,606,661 | 2/1997 | Wear et al. | 714/38 |
| 5,701,470 | 12/1997 | Joy et al. | 707/103 |
| 5,706,506 | 1/1998 | Jensen et al. | 707/103 |
| 5,787,413 | 7/1998 | Kauffman et al. | 707/2 |
| 5,845,298 | 12/1998 | O'Connor et al. | 707/206 |
| 5,848,423 | 12/1998 | Ebrahim et al. | 707/206 |
| 5,909,684 | 6/1999 | Nelson | 707/103 |
| 5,913,063 | 6/1999 | McGurrin et al. | 395/702 |
| 5,918,235 | 6/1999 | Kirshenbaum et al. | 707/206 |
| 6,031,995 | 2/2000 | George | 717/10 |
| 6,052,515 | 2/2000 | Bruckhaus | 716/1 |

*Primary Examiner*—Hosain T. Alam
*Assistant Examiner*—Jean Bolte Fleurantin
*Attorney, Agent, or Firm*—Blakely, Sokoloff, Taylor & Zafman LLP

[57] ABSTRACT

A method and apparatus to perform memory management in an object oriented programming environment. Specifically, a first object, an associated count object and a first reference pointer to the first object are created. The count object includes a reference counter that is incremented when the first reference pointer to the first object is copied. Alternatively, a first object and an associated pointer list are created. Each entry in the pointer list includes a pointer to a previous pointer list entry and a pointer to a next pointer list entry.

9 Claims, 14 Drawing Sheets

PERFORMING MEMORY MANAGEMENT IN AN OBJECT-ORIENTED PROGRAMMING ENVIRONMENT

FIELD OF THE INVENTION

The present invention relates to the field of object-oriented programming. Specifically, the present invention relates to a method and apparatus for performing memory management in an object-oriented programming environment.

DESCRIPTION OF RELATED ART

In object-oriented programming, an "object" is a software package that contains a collection of related procedures (or "methods") and data (or "variables"). A "class" is a template that defines the methods and variables to be included in a particular object. Once a base class is defined, any number of unique "instances" of the class may be created from the class. The class defines the characteristics shared by all the instances, while the instance itself contains the information that makes the instance unique. Each instance of an object uses some amount of memory and possibly other system resources.

Objects may contain pointers or references to other objects. In general, a program written in an object-oriented language has one or more root objects that are of immediate interest to the application. These root objects, in turn, reference other objects on whose functionality they depend. These references or "pointers" may be dynamically created and destroyed as the program executes. If all references to a non-root object are destroyed, i.e. there are no longer any pointers to the non-root object, then the non-root object is no longer being used and should be destroyed in order to free its memory and other resources. Performing the destruction of these types of unreferenced objects is referred to as "garbage collection."

Various implementations of garbage collection schemes exist today. Some object-oriented programming languages such as C++ do not provide any type of garbage collection at all. In these environments, object destruction must be explicitly managed by the programmer. Other object-oriented programming languages, such as Smalltalk, provide automatic garbage collection. A general method for garbage collection in these types of languages is for the system to periodically perform a check of all objects to determine whether each object is still being referenced by another object. If an object is still being referenced, the object is not touched. If, however, the object is deemed to be no longer necessary because there are no pointers to it, then the system destroys the object, thus freeing up the memory and other resources utilized by the object. This periodic checking behavior introduces heavy system overhead at unpredictable intervals and is therefore not an ideal solution, especially in performance sensitive environments.

Reference counting provides a relatively simple garbage collection mechanism that has a constant incremental overhead. This type of a constant overhead is often desirable even in systems that provide other forms of garbage collection. According to a reference counting scheme, an indicator of some type is used to determine whether an object may be destroyed. While there are still pointers to the object, the indicator informs the system that the object is in continued use and should not be destroyed. These indicators may be created and maintained in a number of ways. FIGS. 1A–B and 2A–B illustrate two existing methods of tracking reference pointers to objects.

FIGS. 1A–C illustrate a C++ implementation of counting "smart pointers." Smart pointers in C++ are objects that are designed to function like standard pointers, but that offer greater functionality. According to this implementation, a base class of reference counted objects is created. Then, as illustrated in FIG. 1A, any time an object is created from this base class, the base class creates a reference counter for smart pointers to the object. When a copy of the smart pointer to the object is created, as illustrated in FIG. 1B, the reference counter in the base class is incremented to represent an additional smart pointer.

When a pointer is deleted, the reference counter is decremented according to the steps in the flow chart of FIG. 1C. More specifically, the reference counter is decremented in step 102. The reference counter is then examined in step 104 to determine whether the count is zero. If the count is zero, then the object is deemed to be unreferenced and may be destroyed in step 106. The pointer is then deleted in step 108. If the count is not zero, then the pointer is simply deleted in step 108. According to this scheme, the object must be derived from the base class of reference counted objects in order to have a count of smart pointers. This type of reference counting scheme presents the programmer with a significant limitation, namely the scheme only keeps track of pointers for objects created from the reference counted base class.

FIGS. 2A–C illustrate an alternative existing method of reference counting. As illustrated in FIG. 2A, an "auto pointer" is associated with an object. An auto pointer is a template from the standard C++ template library. An auto pointer points to an object until the auto pointer is destroyed, and when the auto pointer is destroyed, the pointed-to object is also destroyed. The auto pointer includes a Boolean value that indicates ownership of the object. When the Boolean value is set to "true," the auto pointer is deemed to be the "owner" of the object. As illustrated in FIG. 2B, when a copy of the auto pointer to the object is created, the Boolean value in the original auto pointer is changed to "false" while the Boolean value of the copied auto pointer is now set to "true."

When an auto pointer is deleted according to the steps illustrated in FIG. 2C, the Boolean value is examined in step 202. If the Boolean value is "true," then the object is deleted in step 204 and the auto pointer is deleted in step 206. If the Boolean value is "false," however, the auto pointer is simply deleted in step 206. According to this scheme, there is a danger that an object may in fact still be referenced by an auto pointer that is currently set to "false." To avoid this scenario, auto pointers must be destroyed in the order in which they were created. Although this scheme overcomes the smart pointer scheme limitation described above, it presents the programmer with yet another significant programming limitation.

Thus, although prior art methods of performing reference counting for the purpose of garbage collection do exist in the prior art, each approach suffers from limitations that confine the ability of the programmer to write object-oriented programs that perform efficient memory management.

SUMMARY OF THE INVENTION

The present invention discloses a method and apparatus for performing memory management in an object oriented programming environment. Specifically, a first object, an associated count object and a first reference pointer to the first object are created. The count object includes a reference counter that is incremented when the first reference pointer to the first object is copied. Alternatively, a first object and an associated pointer list are created. Each entry in the pointer list includes a pointer to a previous pointer list entry and a pointer to a next pointer list entry.

Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

The present invention is a method and apparatus for performing memory management in an object-oriented programming environment. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 1A:
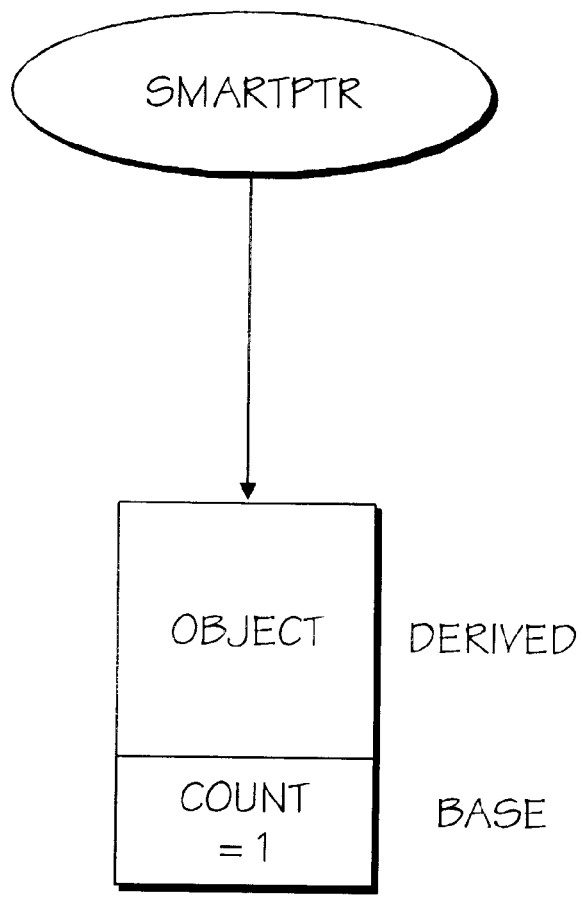
FIGS. 1A–C illustrate a smart pointer reference counting method.
Figure 1B:
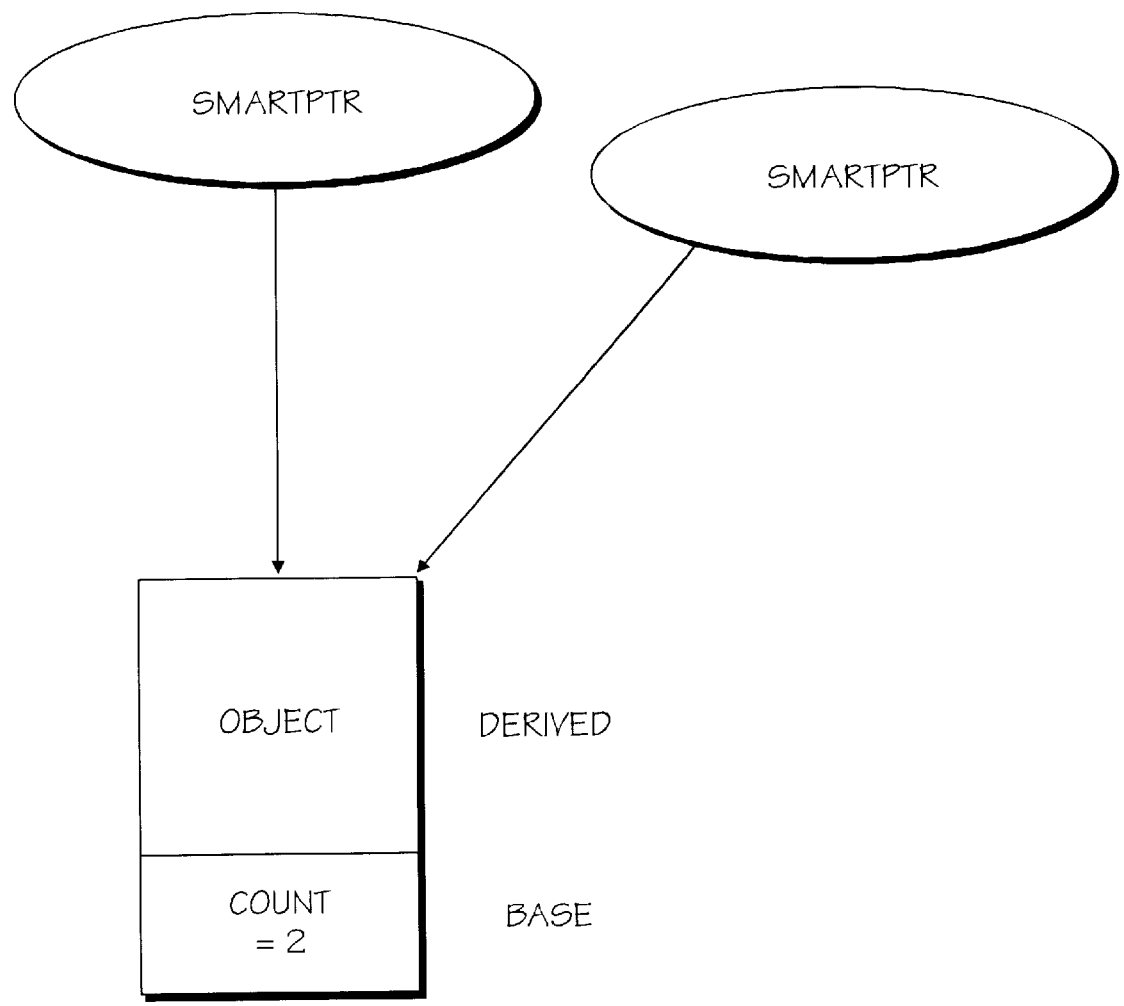
Figure 1C:
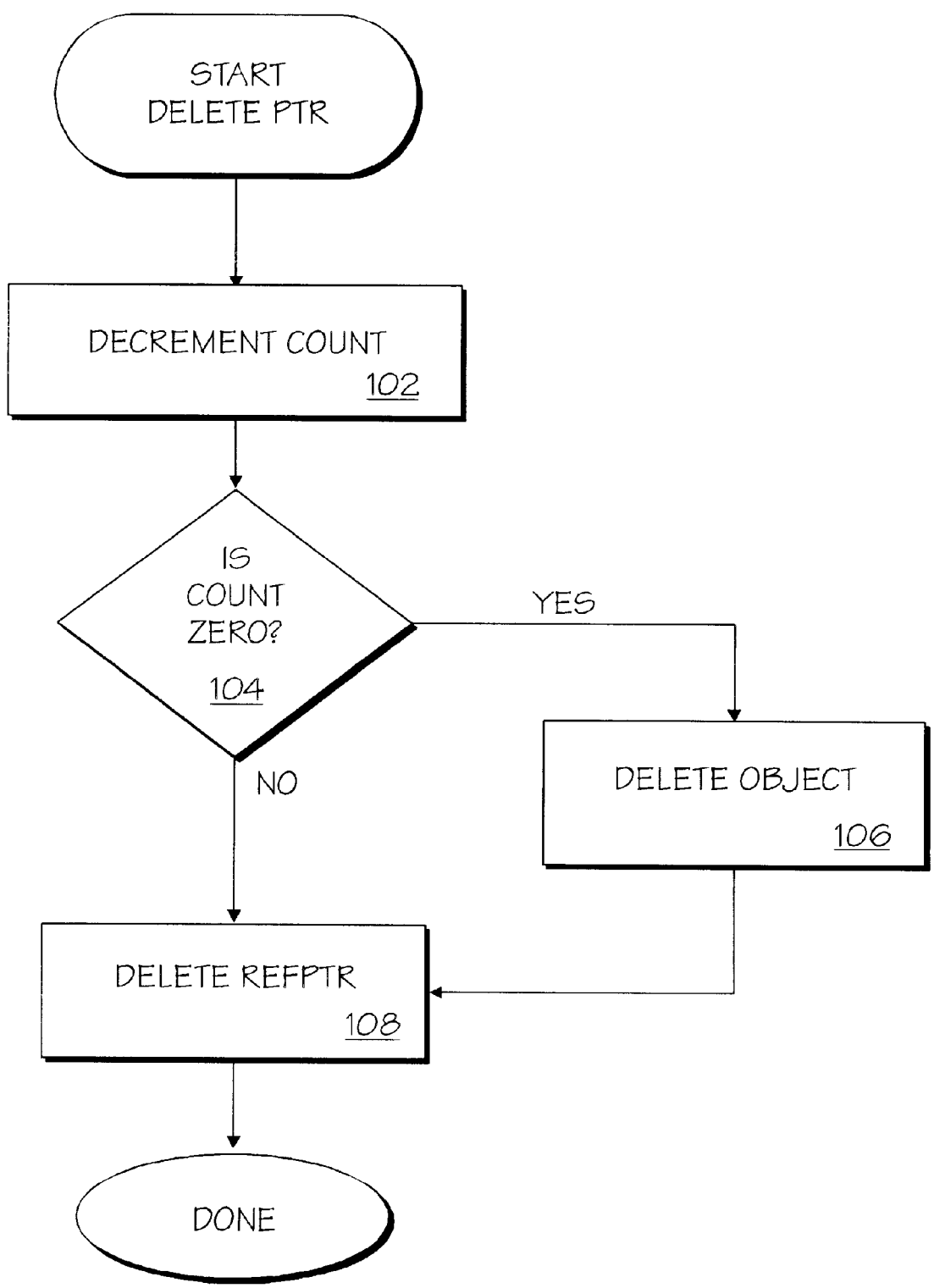
Figure 2A:
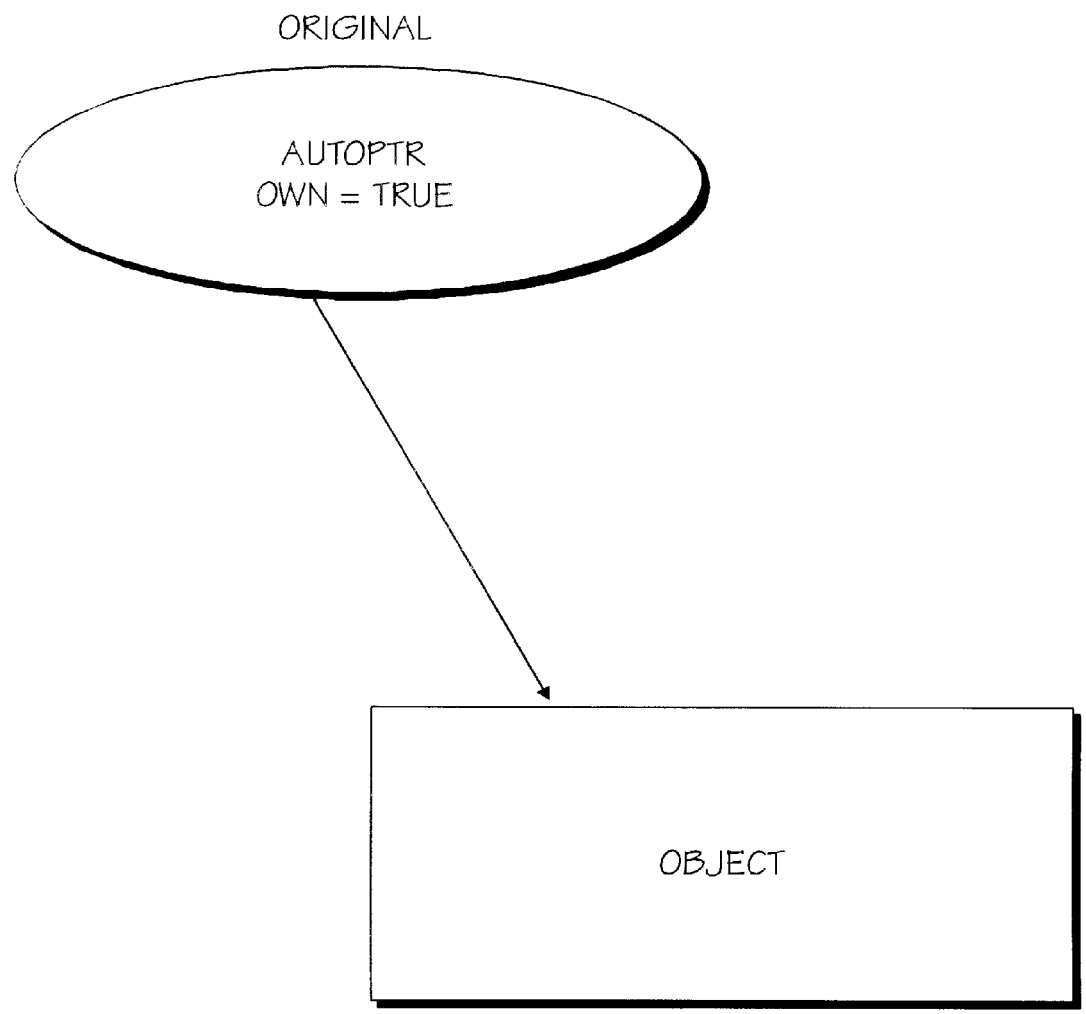
FIGS. 2A–C illustrate an auto pointer reference counting method.
Figure 2B:
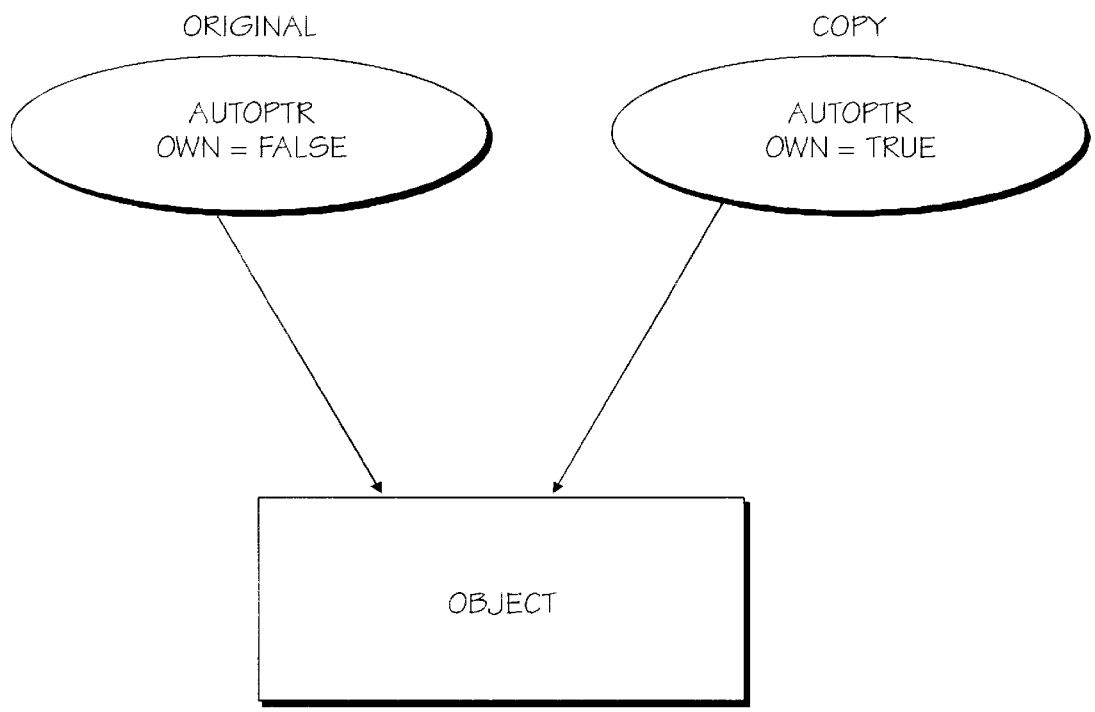
Figure 2C:
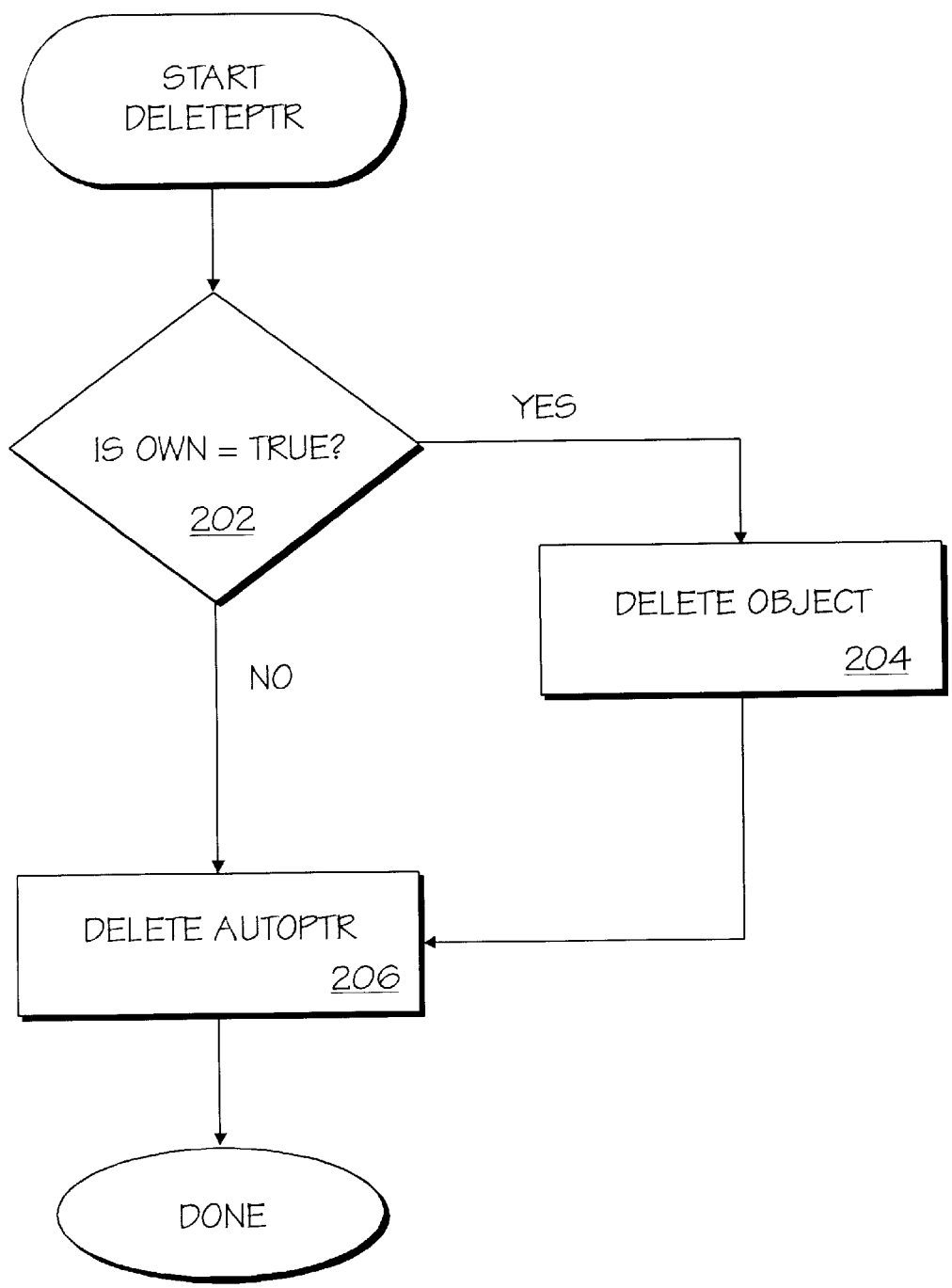
Figure 3:
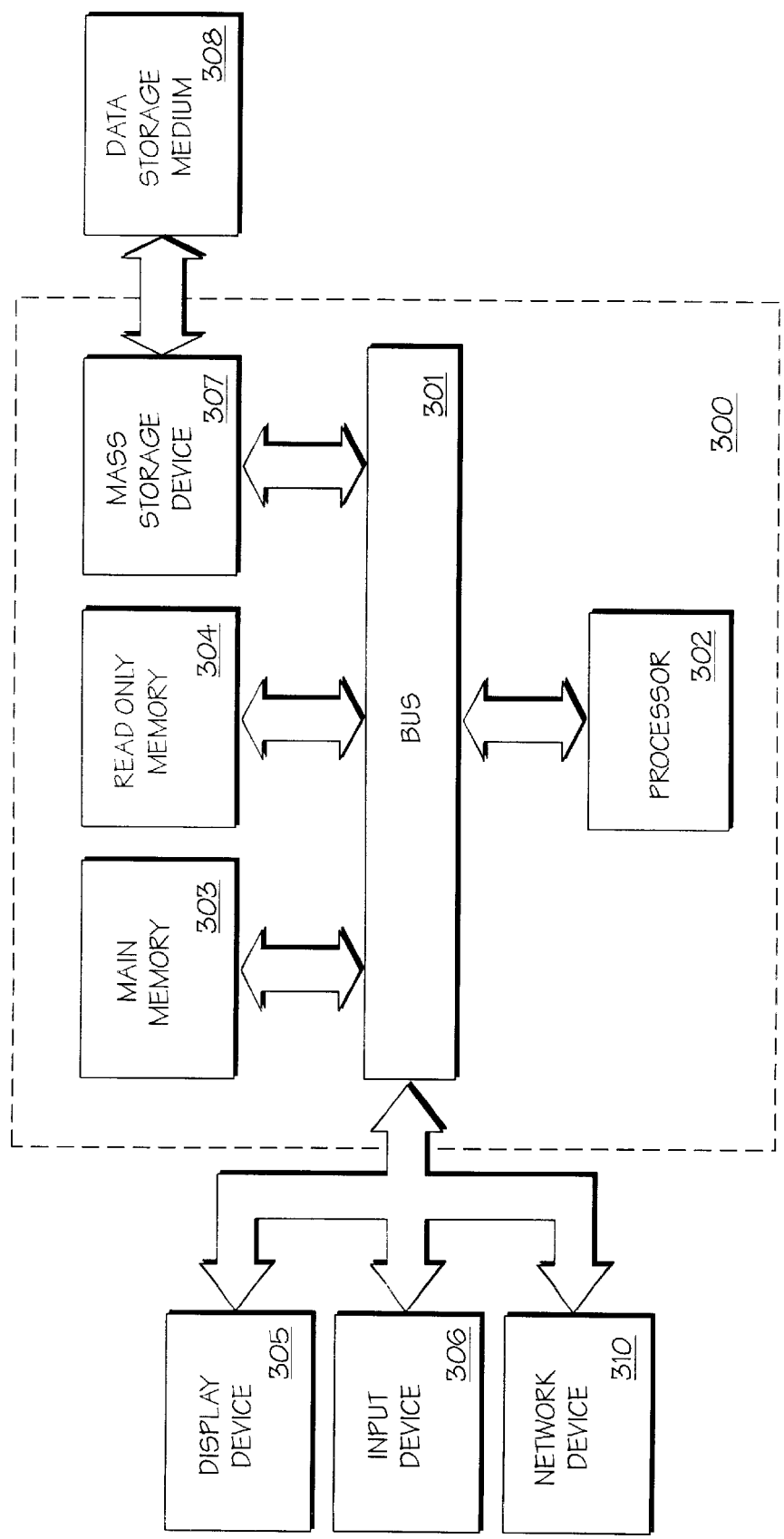
FIG. 3 illustrates a typical computer system on which the present invention may operate.

FIG. 3 illustrates a typical computer system 300 in which the present invention may operate. One embodiment of the present invention is implemented on a personal computer architecture. It will be apparent to those of ordinary skill in the art that alternative computer system architectures, such as proprietary audio/visual system architectures, may also be employed.

In general, such computer systems as illustrated by FIG. 3 comprise a bus 301 for communicating information, a processor 302 coupled with the bus 301 for processing information, main memory 303 coupled with the bus 301 for storing information and instructions for the processor 302, a read-only memory 304 coupled with the bus 301 for storing static information and instructions for the processor 302, a display device 305 coupled with the bus 301 for displaying information for a computer user, an input device 306 coupled with the bus 301 for communicating information and command selections to the processor 302, and a mass storage device 307, such as a magnetic disk and associated disk drive, coupled with the bus 301 for storing information and instructions. A data storage medium 308 containing digital information is configured to operate with mass storage device 307 to allow processor 302 access to the digital information on data storage medium 308 via bus 301.

Processor 302 may be any of a wide variety of general purpose processors or microprocessors such as the Pentium® processor manufactured by Intel® Corporation. It will be apparent to those of ordinary skill in the art, however, that other varieties of processors may also be used in a particular computer system. Display device 305 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 302 retrieves processing instructions and data from a data storage medium 308 using mass storage device 307 and downloads this information into random access memory 303 for execution. Processor 302, then executes an instruction stream from random access memory 303 or read-only memory 304. Command selections and information input at input device 306 are used to direct the flow of instructions executed by processor 302. Equivalent input device 306 may also be a pointing device such as a conventional mouse or trackball device. The results of this processing execution are then displayed on display device 305.

Computer system 300 includes a network device 310 for connecting computer system 300 to a network. Network device 310 for connecting computer system 300 to the network includes Ethernet devices, phone jacks and satellite links. It will be apparent to one of ordinary skill in the art that other network devices may also be utilized.

The present invention overcomes the limitations inherent in the current methods of performing garbage collection. Although the following detailed description assumes a C++ implementation, the present invention may be practiced in other object oriented programming environments.

Figure 4A:
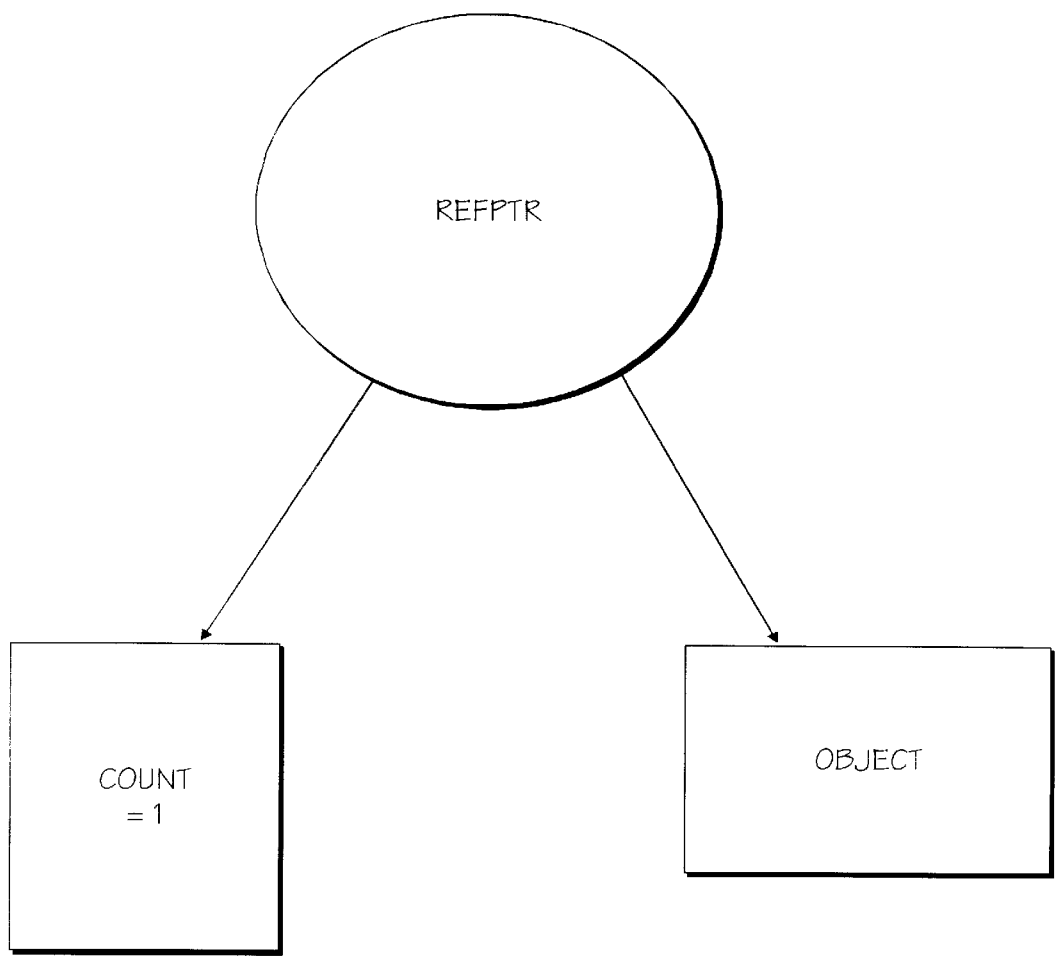
FIGS. 4A–C illustrate an embodiment of the present invention.
Figure 4B:
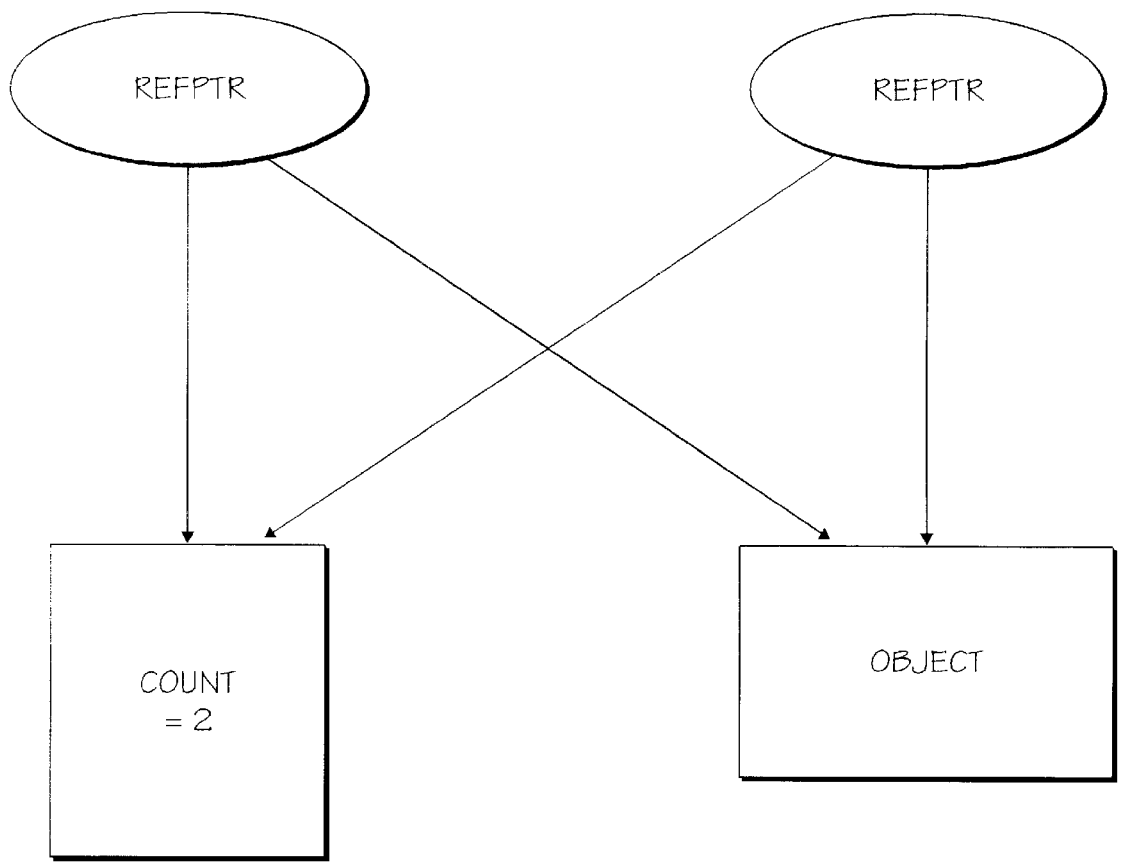
Figure 4C:
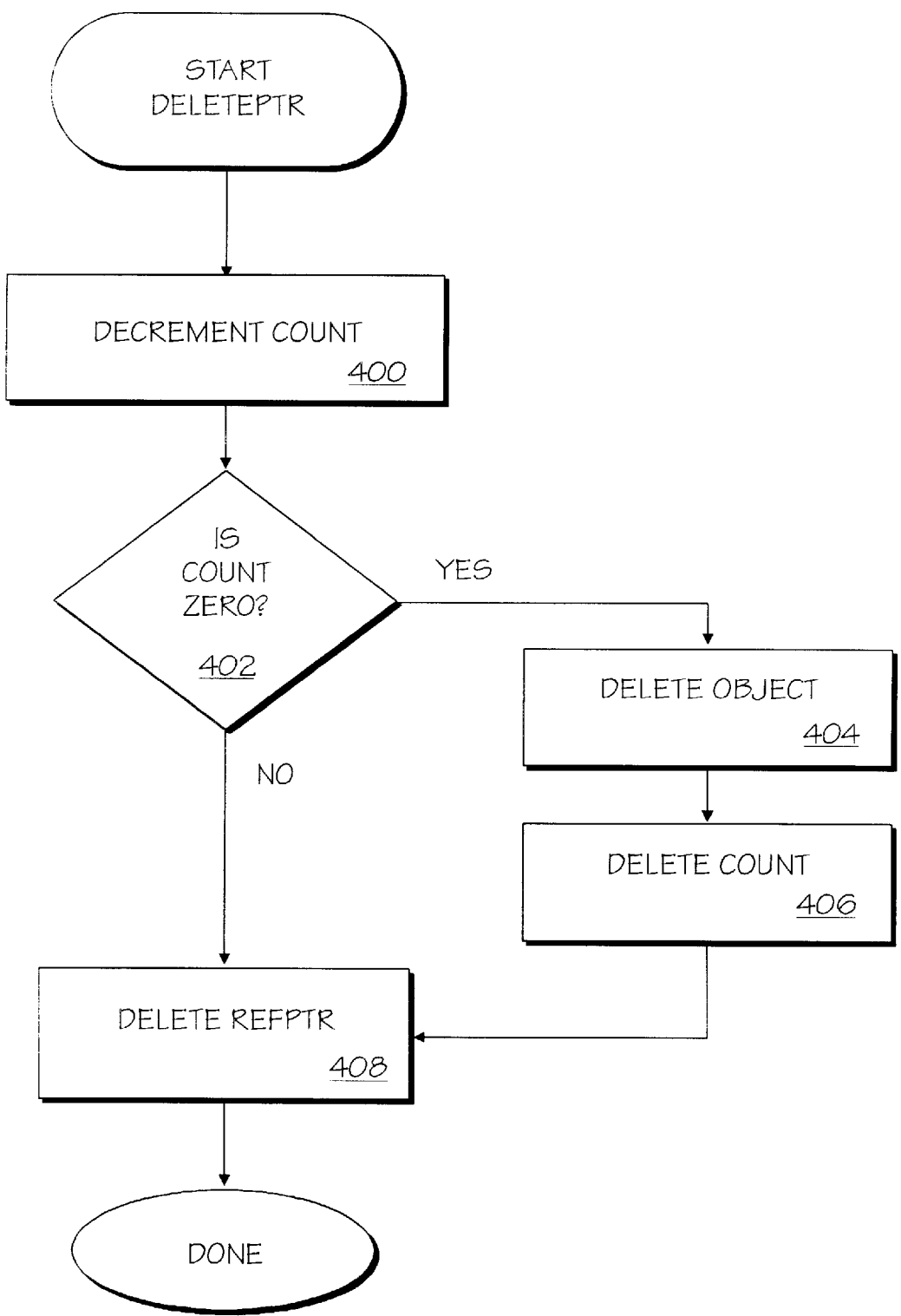

FIGS. 4A–C illustrate one embodiment of the present invention. Specifically, as illustrated in FIG. 4A, when an object is created for the first time, an associated count object and associated reference pointer are also created. The count object is separate and distinct from the original object and includes a reference counter that is initialized to 1. This initial value indicates that there is a single reference pointer pointing to the original object. This reference pointer points to both the original object and the count object.

As illustrated in FIG. 4B, according to one embodiment, when a copy of the original reference pointer is made, the new reference pointer also points to the original object and its associated count object. The reference counter in the count object is incremented from 1 to 2, thus indicating that the object now has 2 reference pointers, namely the original and the copy. As pointers are deleted, the reference counter in the count object is decremented. When the reference counter shows that there are zero pointers to the object, the object may be safely deleted.

FIG. 4C is a flow diagram illustrating this reference counting method. Note that this diagram assumes that a number of pointers have already been created for an object, and the reference counter in the count object reflects the number of pointers. As illustrated, each time a pointer is deleted, the reference counter in the count object is decremented in step 400. The reference counter is then examined to determine whether the count is now set to zero in step 402. If the count is set at zero, then it is determined that there are no longer any pointers pointing to the object. The object is thus deleted in step 404 and the count object associated with the object is also deleted in step 406. Finally, the reference pointer is deleted in step 408 and the object is no longer accessible. The memory associated with the object is now available for use by other programs. If the count is not set at zero, then the reference pointer is simply deleted in step 408.

FIGS. 5A–D illustrate an example of an alternative embodiment of the present invention. According to this embodiment, when an object is created, a pointer list is also created that includes all pointers that reference the object. The pointer list is comprised entirely of pointer list entries. Three pointers are associated with each entry in the list. The pointers include a standard pointer to the object, a "next pointer" pointer and a "previous pointer" pointer. Initially, the list contains a single entry, so the "next pointer" and "previous pointer" pointers both point to the initial list entry because no copies of the object exist.

Figure 5A:
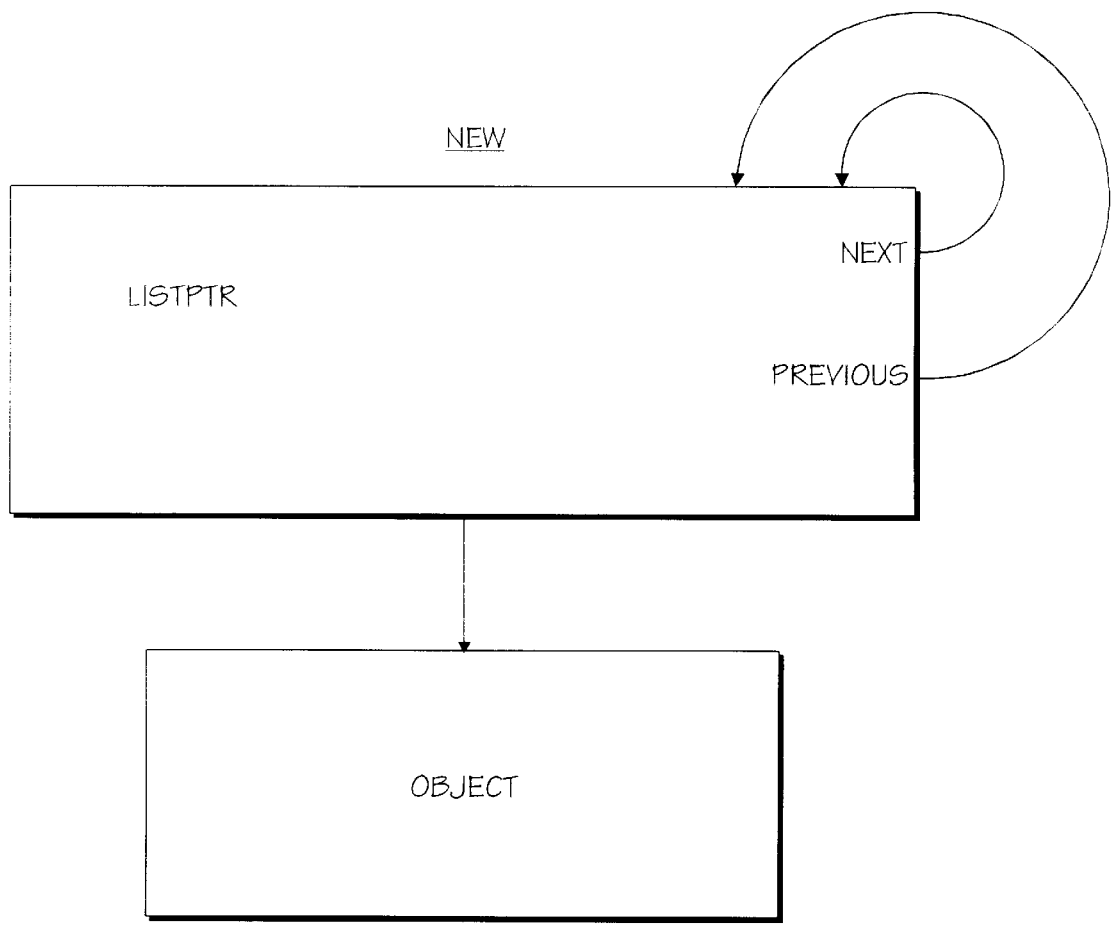
FIGS. 5A–D illustrate an example of an alternative embodiment of the present invention.
Figure 5B:
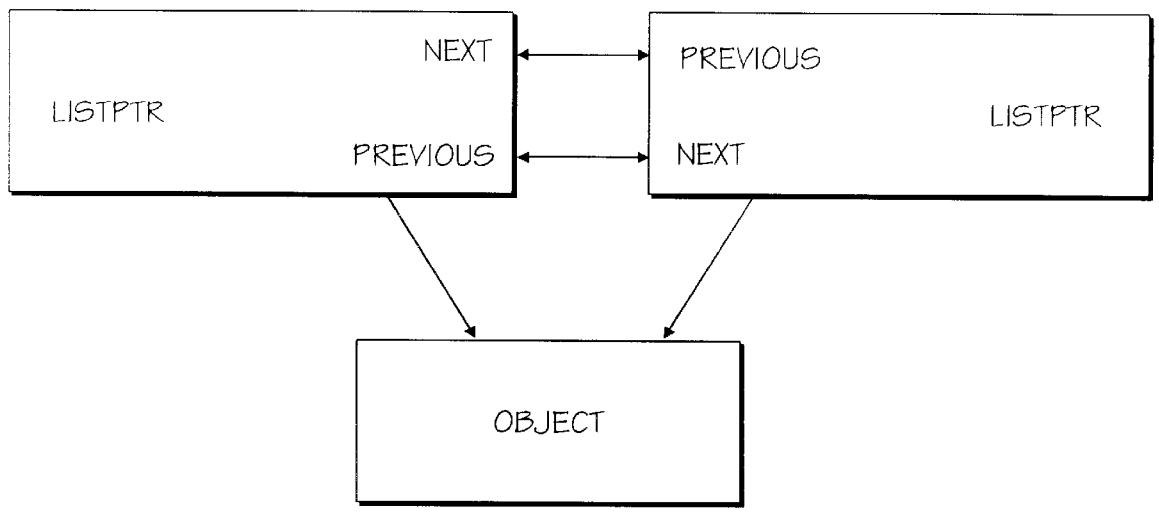
Figure 5C:
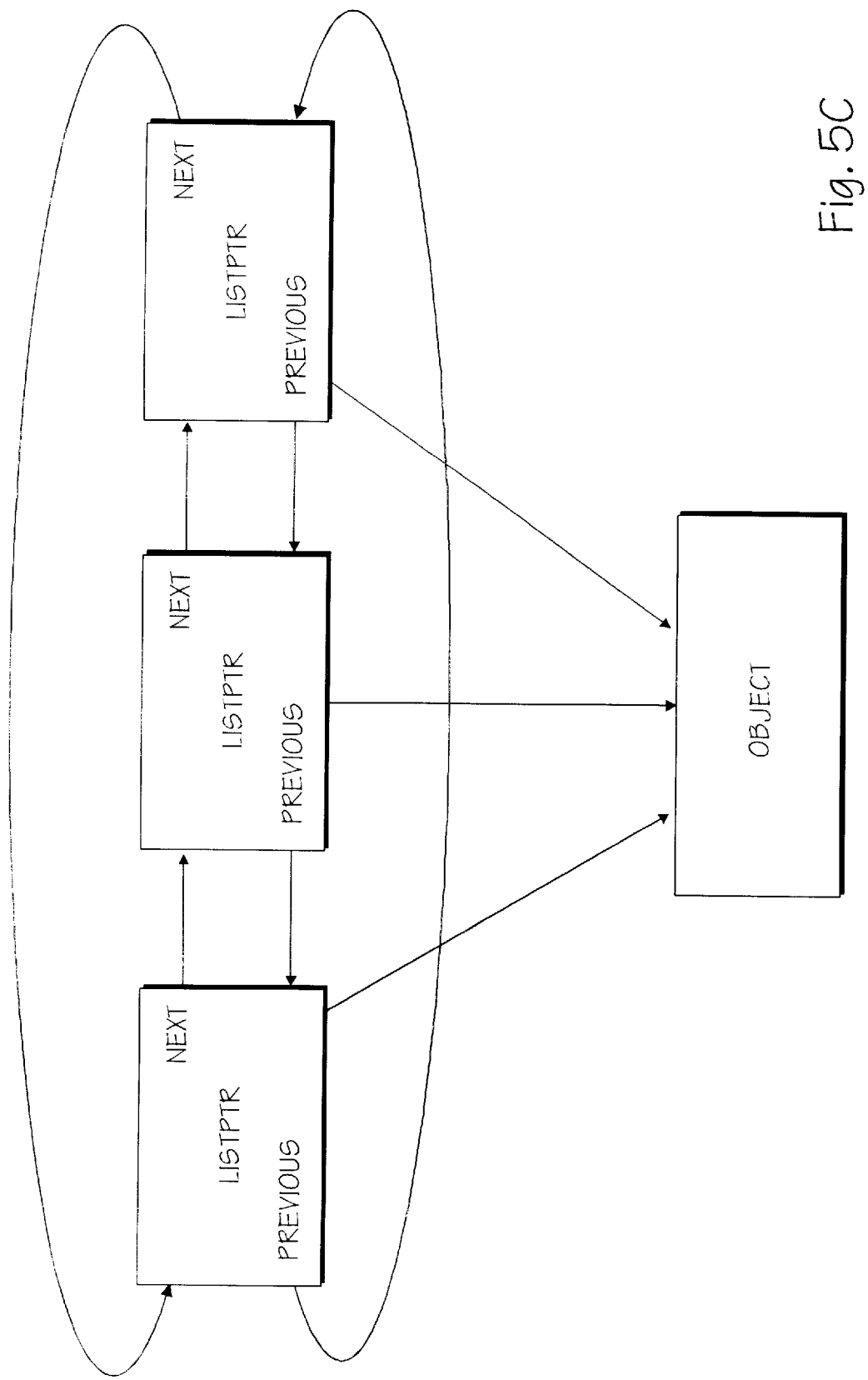

When the object is copied, as illustrated in FIG. 5B, a second entry in the pointer list is created for the same object. The second pointer list entry includes a second standard pointer to the original object. The second pointer list entry also includes a "next pointer" pointer and a "previous pointer" pointer. As illustrated, the "next pointer" pointers and the "previous pointer" pointers now each point to the other entry, i.e. the first and second pointer list entries are now linked to each other. FIG. 5C expands this concept of FIG. 5B to a third reference to the object, i.e. a third pointer list entry. To delete a pointer, the pointer list entry associated with the deleted pointer is deleted. The remaining pointer lists are then modified to reflect the new "next pointer" and "previous pointer" pointers. When the "next pointer" pointer and the "previous pointer" pointer once again point to the same (single) list entry, then the next pointer that is deleted is the last pointer to the object, and the object is then deemed unreferenced and may be deleted.

Figure 5D:
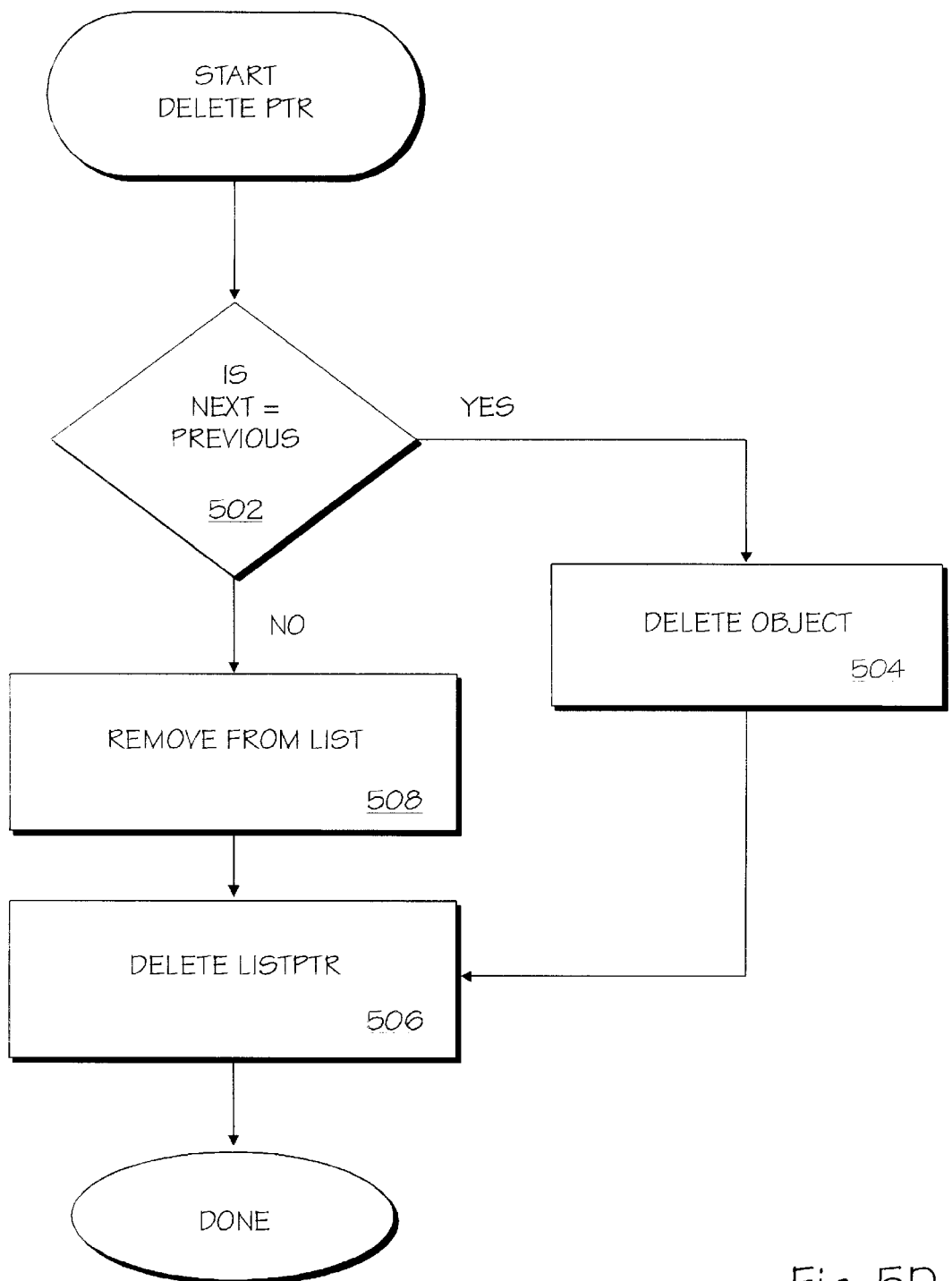

FIG. 5D illustrates the reference counting method according to this embodiment. Note that this diagram assumes that a number of pointers have already been created for an object, and a number of pointer list entries already exist. Prior to deleting a pointer, the "next pointer" and "previous pointer" pointers are examined in step 502. If the "next pointer" pointer is the same as the "previous pointer" then there is clearly only one pointer remaining in the list. When this final pointer is deleted, no pointers will remain in the list. Thus, if the "next pointer" pointer is the same as the "previous pointer" pointer, then the object can be deleted in step 504, and the last pointer to the object can be deleted in step 506. If the "next pointer" pointer is not the same as the "previous pointer" pointer, however, then there are clearly other pointers remaining that point to the object. In this case, a pointer is removed from the list in step 508 and then the pointer is deleted in step 506.

Thus, a method and apparatus for performing memory management in an object-oriented programming environment is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method for performing memory management in an object-oriented programming environment, the computer-implemented method comprising:

creating a first object;

creating a count object associated with the first object, the count object including a reference counter and the count object being distinct from the first object;

creating a first reference pointer that points to the first object and to the associated count object; and incrementing the reference counter in the count object if the first reference pointer is copied.

2. The computer-implemented method according to claim 1 further including:

decrementing the reference counter in the count object if the copy of the first reference pointer to the first object is deleted.

3. The computer-implemented method according to claim 2 further including:

deleting the first object if the reference counter in the count object is set to zero.

4. An apparatus for performing memory management in an object-oriented programming environment, the apparatus comprising:

means for creating a first object;

means for creating a count object associated with the first object, the count object including a reference counter and the count object being distinct from the first object;

means for creating a first reference pointer that points to the first object and to the associated count object; and means for incrementing the reference counter in the count object if the first reference pointer is copied.

5. The apparatus according to claim 4 further comprising:

means for decrementing the reference counter in the count object if the copy of the first reference pointer to the first object is deleted.

6. The apparatus according to claim 5 further comprising:

means for deleting the first object if the reference counter in the count object is set to zero.

7. A machine readable medium having stored thereon data representing sequences of instructions, which when executed by a computer system, cause the computer system to perform an operation of:

creating a first object;

creating a count object associated with the first object, the count object including a reference counter and the count object being distinct from the first object;

creating a first reference pointer that points to the first object and to the associated count object; and incrementing the reference counter in the count object if the first reference pointer is copied.

8. The machine readable medium according to claim 1 wherein the computer system further performs the operation of:

decrementing the reference counter in the count object if the copy of the first reference pointer to the first object is deleted.

9. The machine readable medium according to claim 8 wherein the computer system further performs the operation of:

deleting the first object if the reference counter in the count object is set to zero.

* * * * *